United States Patent [19]

Gerber et al.

[11] 4,252,147
[45] Feb. 24, 1981

[54] ROTARY CONNECTION FOR PASSAGE OF HYDRAULIC OIL

[75] Inventors: Jürgen Gerber, Schwerte; Claus Bertram, Waltrop, both of Fed. Rep. of Germany

[73] Assignee: O & K Orenstein & Koppel Aktiengesellschaft, Berlin, Fed. Rep. of Germany

[21] Appl. No.: 926,825

[22] Filed: Jul. 21, 1978

[30] Foreign Application Priority Data

Jul. 29, 1977 [DE] Fed. Rep. of Germany ....... 2734214

[51] Int. Cl.³ ............................................. F16K 39/00
[52] U.S. Cl. .................................................. 137/580
[58] Field of Search ......................................... 137/580

[56] References Cited

U.S. PATENT DOCUMENTS

| | | | |
|---|---|---|---|
| 3,908,695 | 9/1975 | Dunbar | 137/580 |
| 3,923,133 | 12/1975 | Chivari | 137/580 X |
| 4,168,654 | 9/1979 | Wilson | 137/580 X |

Primary Examiner—William R. Cline
Attorney, Agent, or Firm—Martin A. Farber

[57] ABSTRACT

Rotary connection having a housing which is provided with annular ducts and with feed bores for pressurized oil and non-pressurized oil and having a piston-shaped inner part arranged in the housing, the inner part being formed with bores and with grooves on its periphery, for the passage of high-pressure oil and practically non-pressurized hydraulic oil. By means of a valve piston which can be acted-on at both end surfaces thereof with pressurized oil, lubricating ducts are connected, depending upon the switched position of the valve piston, via a central longitudinal bore provided with transverse bores, with the respective annular duct which at the time is not applied with pressurized oil.

7 Claims, 4 Drawing Figures

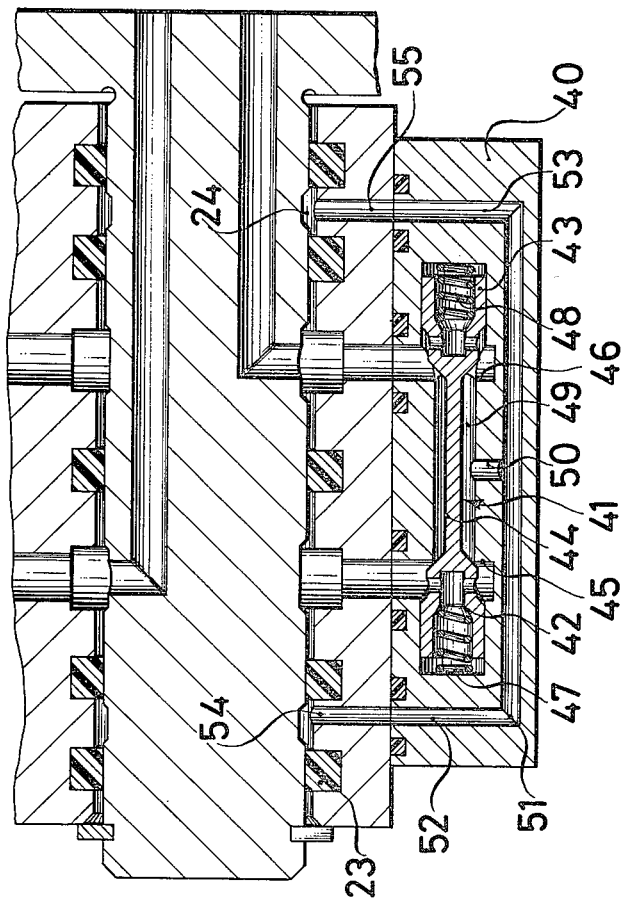

ROTARY CONNECTION FOR PASSAGE OF HYDRAULIC OIL

The invention relates to a rotary connection having a housing which is provided with annular ducts and with feed bores for pressurized oil and non-pressurized oil and having a piston-shaped inner part arranged in the housing, the inner part being formed with bores and with grooves on its periphery, for the passage of high-pressure oil, and practically non-pressurized hydraulic oil therethrough.

In one known rotary passage formation intended for the hose drum or reel of a forklift, with which rotary passage the housing is provided with annular ducts and with an inner part with bores, which inner part is rotatable in the axial direction relative to the housing, elastomeric seals are provided on both sides of each annular duct in order to prevent the passage or stepping over of pressurized oil between the individual ducts and an exiting of pressurized oil to the atmosphere. As a result, the high-pressure seals which seal-off from the atmosphere are subject to very strong wear as a result of a defective or deficient supply of lubricating oil. The feeding of lubricating oil from a special lubricating and leakage oil conduit is very difficult to provide in the case of this known arrangement. In another known arrangement, a separate or special lubricating duct is provided between the high-pressure seals and the atomsphere, which duct is supplied with oil from a non-pressurized conduit (leakage-oil conduit).

It is an object of the present invention to supply the ducts which serve for the feeding of lubricating oil, with oil from the then respectively non-pressurized conduit of a rotary passageway.

It is another object of the invention to aid in the solution of the above-mentioned object in the manner that by means of a valve piston (30 or 41) which can be acted on at both end surfaces with pressurized oil, lubricating ducts (23, 24) are connected, depending upon the switched position of the valve piston (30 or 41), via a central longitudinal bore (35 or 51) provided with transverse bores, with the annular duct which is not acted on with pressurized oil at the time.

The advantage of the arrangement in accordance with the invention resides in the fact that an effective supplying of the seals which face the atmosphere is periodically effected by means of the oil which becomes non-pressurized, respectively from time to time, during the operating cycle.

It is another object of the invention further cooperatively to arrange the valve piston (30) in a bore (25) of the piston-like inner part (2), and to connect a longitudinal bore (35), which is also formed in the piston-like inner part (2), and transverse bores (34, 36 and 37) which are connected with the lubricating ducts (23, 24), with the bore (25) of the valve piston (30).

It is still another object of the invention additionally cooperatively to provide the valve piston (41), which is accommodated in a housing (40), which housing is flanged onto the housing (1) of the rotary connection, with two valve cones (42, 43) which are connected to each other by a rod (44) and to arrange the valve piston such that, depending on the switched position of the valve piston (41), the non-pressurized annular duct (8 or 13) is connected, via a longitudinal bore (51) which extends within the housing (40) of the valve piston (41), with the lubricating ducts (23, 24) of the piston-like inner part (2).

With the above and other objects and advantages in view, the present invention will become more clearly understood in connection with the following detailed description of two preferred embodiments, when considered with the accompanying drawings, of which:

FIG. 4 is a longitudinal section through another embodiment showing a rotary connection with a flanged valve.

Figure 1:
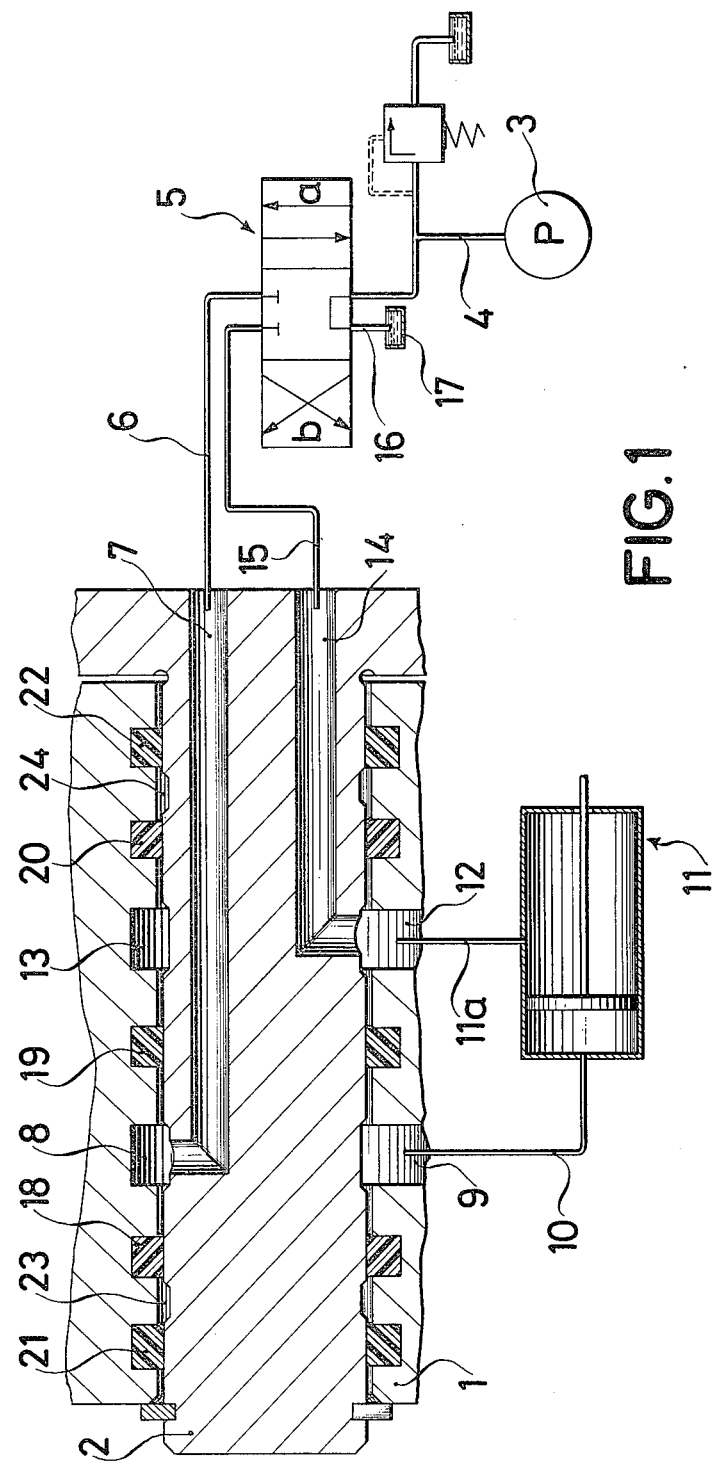
FIG. 1 is a longitudinal section through a rotary connection in the plane of the annular ducts in accordance with the present invention.
Figure 3:
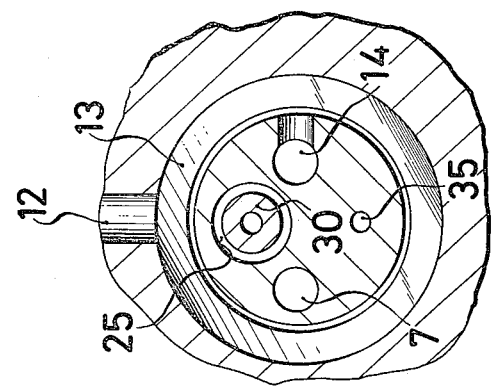
FIG. 3 is a cross-section through a rotary connection taken along the line III—III of FIG. 2.
Figure 2:
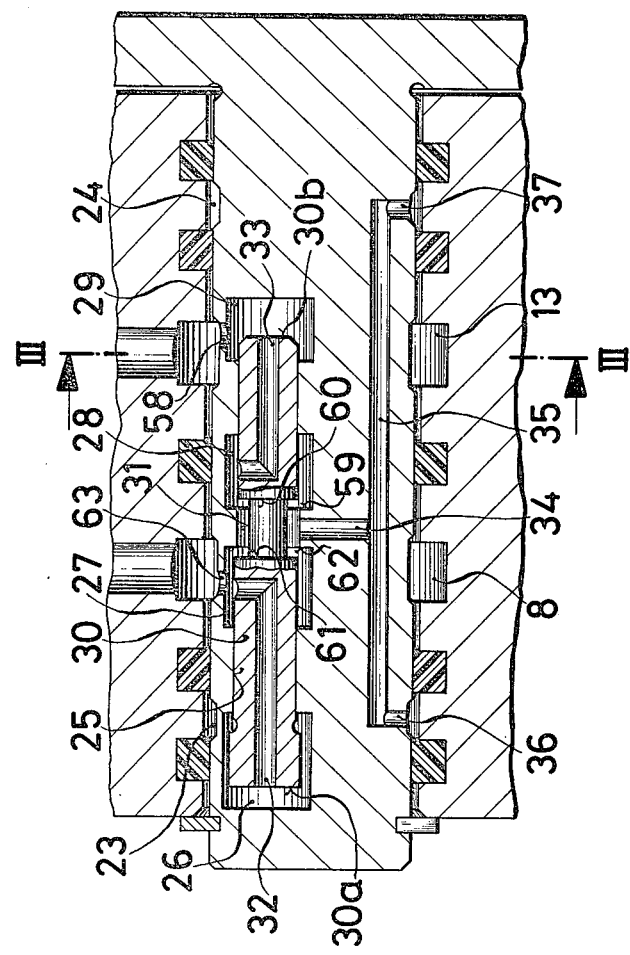
FIG. 2 is a longitudinal section through a rotary connection perpendicular to the section according to FIG. 1, in the plane of the valve and the lubrication oil bore.

Referring now to the drawings and more particularly to the embodiment of FIGS. 1-3, a piston-like inner part 2 is rotatably mounted in an opening in a housing 1. Pressurized oil passes from a pump 3, via a conduit 4, a slide valve 5 which is in its left-most position "a" connected to a conduit 6, and the conduit 6, to a bore 7 formed in the inner part 2 and, from there, via an annular duct 8, a connection 9, and a conduit 10 to a utilizing or consumption device 11. The oil coming from the consumption device 11 flows via a conduit 11a, a connection 12, an annular duct 13, a longitudinal bore 14 formed in the inner part 2, a conduit 15, the slide valve 5, and a conduit 16, into the tank 17. The sealing of the inner part 2 with respect to the housing 1 is effected by double-acting seals 18, 19 and 20 which at the same time seal-off the annular ducts 8 and 13, and by seals 21 and 22 which also seal-off lubricating ducts 23 and 24 from the atmosphere.

As seen in FIGS. 2 and 3, within a bore 25, which widens to form the valve chambers 26, 27, 28 and 29, a valve piston 30 is displaceably mounted. The valve piston is provided in its central portion with a groove 31 as well as with bores 32, 33, each of the latter opening at an end surface, respectively, of the valve piston 30 and exiting radially on its periphery, respectively, before the groove 31. Through a transverse bore 34, a central longitudinal bore 35, and transverse bores 36 and 37, a connection is established to the lubricating ducts 23 and 24.

In the embodiment shown in FIG. 4, a housing 40 is flanged onto the housing 1, the housing 40 serving to receive a valve piston 41, the latter being formed as a twin check valve. The two conically shaped valve cones 42 and 43 are thereof are rigidly connected to each other by a rod 44 and cooperate with two valve seats 45 and 46, respectively. The inside of the valve cones 42 and 43 are open and accomodate springs 47 and 48, respectively, by means of which the valve piston 41 is held in its neutral position as soon as the valve cones 42 and 43 are not engaged or acted upon. The annular space 49 surrounding the rod 44 stands in connection with the lubricating ducts 23 and 24 via the transverse bore 50, the central longitudinal bore 51, and the bores 52, 53 and 54, 55.

The manner of operation is as follows:

The pressure which is present in the annular duct 8 passes into the valve chamber 27 via a bore 63, and acts on one end surface 30a of the valve piston 30 via the bore 32. As a result the valve piston 30 is moved to the right until the control edges 61 and 62 are covered or overlap, while the control edges 59 and 60 are opened wider. In this way communication is produced from the connection 12, via the annular duct 13, the bore 33, between the control edges 59 and 60, and the bores 34, 35, 36 and 37, to the lubricating ducts 23 and 24, while the passageway communication therefrom to the annular duct 8 which is then admitted with pressure is blocked or interrupted by means of the overlapping abutting control edges 61 and 62.

If the direction of the pressure is changed by shifting the slide valve 5 to the right into position "b", i.e. if the connection 14 is connected to pressure and the connection 7 is connected to the tank 17, then the pressure passes from the annular duct 13 via the transverse bore 58, the valve chamber 29, and the bore 33 in the valve piston 30 into the valve chamber 28. By action on the end surface 30b, the valve piston 30 is displaced to the left until the control edges 59 and 60 overlap or cover each other so that the pressurized oil cannot pass into the lubricating ducts 23 and 24. Rather, the lubricating ducts 23 and 24 are connected, via the bores 34, 35, 36 and 37, between the control edges 61 and 62, the valve chamber 27, and the bore 63 in the inner part 2, to the then non-pressurized annular duct 8.

The manner of operation of the other embodiment of the valve, as shown in FIG. 4, corresponds to the above description. That is when the channel 8 is pressurized, the pressurized oil passes through the communicating transverse and longitudinal bores in the left side of the valve piston 41, namely in the valve cone 42, to the left end surface of the piston 41. As a result the piston 41 moves to the right into the position illustrated in FIG. 4, with the valve cone 42 engaging the valve seat 45, blocking the annular chamber 49 from communication with the pressurized oil in the channel 8, however permitting the non-pressurized oil in the annular channel 13 to pass into the annular chamber 49 (since the valve cone 43 does not engage the valve seat 46) and from there into the lubricating ducts 23 and 24 via the conduits 50–55. If the slide valve 5 is switched to the right "b" position of FIG. 1, then the high pressure oil in the bore 14 and the annular duct 13 flows through the communicating transverse and longitudinal bores in the right side valve cone 43 of the piston 41 (now in the position of FIG. 4) to the right end surface of the piston 41, on which right end surface the pressurized oil now acts. As a result the piston 41 shifts to the left, closing the valve seat 46 and opening the valve seat 45, whereupon the pressurized oil from the bore 14 and the annular duct 13 is blocked from communication with chamber 49, and instead the non-pressurized oil then in the annular channel 8 enters the annular chamber 49 and from there into the lubricating ducts 23, 24, via the lines 50–55.

While we have disclosed two embodiments of the present invention, it is to be understood that these embodiments are given by example only and not in a limiting sense.

We claim:

1. A rotary connection comprising
  a housing having an inner wall defining an opening formed with annular ducts communicating with the opening and said housing defining feed bores communicating with said annular ducts and adapted for passage therethrough of pressurized oil and non-pressurized hydraulic oil, respectively,
  a piston-shaped inner part rotatably mounted in said opening in said housing, said inner part being formed with annular lubricating ducts on its periphery and with first bores therein, the latter rotatably communicating with said annular ducts, respectively, and adapted for selective admission therethrough of high pressurized oil and substantially non-pressurized hydraulic oil, respectively,
  a member formed with a central longitudinal bore and transverse bores communicating with each other, said transverse bores communicating with said annular lubricating ducts,
  valve piston means having end surfaces, respectively, adapted to be acted on with the pressurized oil and for switching position thereof in response thereto for providing communication and non-communication, respectively, between said annular ducts, respectively, and said central longitudinal bore, and depending on the switched position of said valve piston means, the latter for communicating said annular lubricating ducts via said central longitudinal bore with one of said annular ducts which is not admitted at the time with pressurized oil.

2. The rotary connection according to claim 1, wherein
  said member constitutes said piston-shaped inner part,
  said piston-shaped inner part is formed with a piston bore,
  said valve piston means is displaceably arranged in said piston bore,
  said transverse bores communicate with said lubricating ducts and communicate said piston bore with said central longitudinal bore.

3. The rotary connection according to claim 1, wherein
  said member constitutes a flange housing flanged onto said first-mentioned housing, said flange housing is formed with a piston bore, one of said transverse bores directly communicates said piston bore with said central longitudinal bore and other of said transverse bores directly communicate said central longitudinal bore with said annular lubricating ducts,
  said valve piston means is displaceably accommodated in said piston bore in said flanged housing,
  said valve piston means includes,
    two valve cones,
    a rod connects said two valve cones with each other,
  said valve piston means and said two valve cones, respectively, for cooperating with said piston bore such that, depending on the switched position of said valve piston means and said two valve cones, respectively, the non-pressurized said one annular duct at the time communicates via said central longitudinal bore with said annular lubricating ducts of said piston-shaped inner part.

4. The rotary connection according to claim 3, wherein
  said two valve cones taper in directions pointing toward each other,
  valve seats complementary to said valve cones are formed in said piston bore adjacent said valve cones, respectively, passage means communicating said annular ducts with said piston bore adjacent said valve seats, respectively,
  said valve cones are formed with communicating longitudinal and transverse bores, the latter communicating with said passage means and the former communicating with one of said end surfaces of said valve piston means, respectively, said piston bore has a diameter larger than said rod adjacent thereto forming an annular chamber thereabout between said valve seats and said valve cones, respectively, said one of said transverse bores is connected to said annular chamber.

5. The rotary connection according to claim 4, further comprising springs disposed in said longitudinal bores in said valve cones, respectively, and abutting an end of said piston bore, respectively, said springs constituting means for holding said valve piston means in a neutral position as soon as said valve cones are not acted on.

6. The rotary connection according to claim 2, wherein said piston bore is formed with a radially inwardly stepped central portion forming annular portions, said valve piston means has two halves defining annular facing portions and a rod connecting said halves, said rod has a diameter smaller than that of said central portion of said piston bore, the latter defining an annular chamber thereabout between said annular portions thereof, said annular facing portions of said two halves of said valve piston means and said annular portions of said piston bore form cooperatively overlapping portions, respectively, constituting valves, said halves of said valve piston means are each formed with a piston longitudinal bore communicating with one of said end surfaces and a radial bore communicating with said piston longitudinal bore, said radial bores of said halves communicate with said piston bore in front of said overlapping portions and communicate with said annular ducts, respectively.

7. The rotary connection according to claims 1, 2, 3 or 6, further comprising annular sealing means disposed between said inner wall of said housing in said opening against the periphery of said inner part on both sides of said annular ducts and said annular lubricating ducts for sealing all said ducts, respectively, one of said sealing means constitutes outer sealing means for sealing one of said annular lubricating ducts, respectively, from the atmosphere, said outer sealing means and the corresponding one of said annular lubricating ducts respectively being applied continuously with said substantially non-pressurized hydraulic oil via said central longitudinal bore and said transverse bores via said one of said annular ducts which is not admitted at the time with pressurized oil, and periodically alternately via the other of said annular ducts which subsequently is not admitted with pressurized oil.

* * * * *